(12) United States Patent
Shigemoto et al.

(10) Patent No.: US 9,415,771 B1
(45) Date of Patent: Aug. 16, 2016

(54) CONTROL DEVICE FOR A HYBRID VEHICLE

(71) Applicant: Nissan Motor Co., Ltd., Yokohama-shi, Kanagawa (JP)

(72) Inventors: Shunsuke Shigemoto, Isehara (JP); Morihiro Nagamine, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 21 days.

(21) Appl. No.: 14/434,419

(22) PCT Filed: Oct. 30, 2013

(86) PCT No.: PCT/JP2013/079423
§ 371 (c)(1),
(2) Date: Apr. 9, 2015

(87) PCT Pub. No.: WO2014/077131
PCT Pub. Date: May 22, 2014

(30) Foreign Application Priority Data

Nov. 16, 2012 (JP) ................. 2012-251776

(51) Int. Cl.
| | |
|---|---|
| *B60W 10/02* | (2006.01) |
| *B60W 10/107* | (2012.01) |
| *B60W 10/06* | (2006.01) |
| *B60W 10/08* | (2006.01) |
| *B60W 10/18* | (2012.01) |
| *B60W 20/00* | (2016.01) |
| *B60K 6/543* | (2007.10) |
| *B60K 6/387* | (2007.10) |

(52) U.S. Cl.
CPC ............... *B60W 20/14* (2016.01); *B60K 6/387* (2013.01); *B60K 6/543* (2013.01); *B60W 10/02* (2013.01); *B60W 10/06* (2013.01); *B60W 10/08* (2013.01); *B60W 10/107* (2013.01); *B60W 10/18* (2013.01); *B60W 20/30* (2013.01); *B60W 2540/12* (2013.01); *B60W 2710/0644* (2013.01); *B60W 2710/1005* (2013.01); *B60Y 2200/92* (2013.01); *Y10S 903/93* (2013.01); *Y10S 903/947* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,788,597 A | * | 8/1998 | Boll .................. | B60K 6/46 180/165 |
| 5,934,395 A | * | 8/1999 | Koide ............... | B60K 6/40 180/65.235 |
| 6,122,588 A | * | 9/2000 | Shehan ............. | B60K 31/047 180/167 |
| 2007/0273204 A1 | | 11/2007 | Kodama et al. | |
| 2010/0257852 A1 | | 10/2010 | McCormick et al. | |

FOREIGN PATENT DOCUMENTS

| | | |
|---|---|---|
| CN | 101284533 A | 10/2008 |
| EP | 2657096 A1 | 10/2013 |
| JP | 2000-310133 A | 11/2000 |

(Continued)

*Primary Examiner* — Thomas Tarcza
*Assistant Examiner* — Edward J Pipala
(74) *Attorney, Agent, or Firm* — Global IP Counselors, LLP

(57) ABSTRACT

A control device in a hybrid vehicle includes a controller capable of switching, between an operating state and a non-operating state, a fuel-cut recovery control in which engine rotation speed is kept at or above a predetermined rotation speed by starting supply of fuel upon the engine rotation speed falling to the predetermined rotation speed from a state in which the engine rotation speed is higher than the predetermined rotation speed and the supply of fuel is stopped.

4 Claims, 6 Drawing Sheets

(56) References Cited

FOREIGN PATENT DOCUMENTS

| JP | 2002-139136 A | 5/2002 |
| JP | 2005-212519 A | 8/2005 |
| JP | 2006-193139 A | 7/2006 |
| JP | 2010-23628 A | 2/2010 |
| WO | 2012/086088 A1 | 6/2012 |

* cited by examiner

| | L/B | H/C | R/B |
|---|---|---|---|
| FIRST SPEED | O | × | × |
| SECOND SPEED | × | O | × |
| REVERSE | × | × | O |
| NEUTRAL | × | × | × |

CONTROL DEVICE FOR A HYBRID VEHICLE

CROSS-REFERENCE TO RELATED APPLICATIONS

This application is a U.S. National stage application of International Application No. PCT/JP2013/079423, filed Oct. 30, 2013, which claims priority to JP Patent Application No. 2012-251776 filed on Nov. 16, 2012, the contents of each of which are hereby incorporated herein by reference.

BACKGROUND

1. Field of the Invention

The present invention relates to a control device for a hybrid vehicle that has an engine and an electric motor mounted thereon as power sources, the device making it possible to select between an electric travel mode (EV mode), in which traveling is performed using the electric motor only, and a hybrid travel mode (HEV mode), in which traveling is performed using the electric motor and the engine.

2. Background Information

Conventionally known hybrid vehicles of such description include the type disclosed in Japanese Laid-Open Patent Application No. 2002-139136, in which an engine, which is one of the power sources, is decouplably drive-coupled to a wheel by a continuously variable transmission and a clutch, and an electric motor, which is the other power source, is permanently coupled to the wheel.

In this hybrid vehicle, when the accelerator pedal is released and the vehicle speed is equal to or less than a predetermined vehicle speed, stopping the engine and releasing the clutch make it possible to perform regenerative travel (EV travel) in EV mode in which only the electric motor is used. Releasing the clutch as described above during EV travel decouples the engine in a stopped state (as well as the transmission, if present) from the wheels and prevents the engine (transmission) from being dragged (caused to co-rotate) during regenerative travel in EV mode, making it possible to prevent the corresponding energy loss and improve energy efficiency.

SUMMARY

In the technique disclosed in Japanese Laid-Open Patent Application No. 2002-139136, if a predetermined vehicle speed that is a threshold value at which the engine is stopped is set in a high-vehicle-speed region, the time taken for the vehicle to come to a stop increases, creating the possibility of the driver repeating the operation of depressing and easing the brake pedal in the meantime. When the braking operation is repeated in a state in which the engine is stopped, the negative pressure of the brake booster (boosting means or device) decreases, increasing the risk of producing a state in which the brake pedal cannot be significantly depressed and the driver is imparted with a sense of unease.

With a focus on the abovementioned problem, an object of the present invention is to provide a control device for a hybrid vehicle capable of preventing a sense of unease from being imparted to the driver even when a brake pedal is operated, while a clutch between an engine and a drive wheel is released and the vehicle is decelerating.

In order to achieve the above object, the present invention is a hybrid vehicle provided with a negative pressure brake booster for using a negative pressure of an engine to assist the brake-pedal-depressing force applied by the driver using, wherein when a clutch disposed between an engine and a drive wheel is to be released and a regenerative torque is to be applied to the drive wheel using an electric motor, a fuel cut recover control is switched to an operational state prior to the clutch being released and the engine rotation speed is maintained at or above a predetermined rotation speed.

Specifically, keeping the engine rotation speed at or above a predetermined rotation speed ensures a negative pressure, and even if the driver repeats the brake pedal operation prior to the vehicle coming to a stop, a boosting device is able to deliver an assist function, making it possible for the brake pedal to be depressed. Accordingly, braking can be performed without imparting the driver with a sense of unease. In addition, since negative pressure can be obtained, the predetermined vehicle speed Vnew can be set so as to be relatively high, making it possible to recover regenerative energy in a more efficient manner. Furthermore, since it is possible to maintain the rotating state of the continuously variable transmission and to secure a supply of hydraulic pressure due to operation of the oil pump, the continuously variable transmission can be shifted to a desired gear speed ratio, and an appropriate gear speed ratio can be obtained, e.g., during a restart or when there is a request for a reacceleration.

BRIEF DESCRIPTION OF THE DRAWINGS

Referring now to the attached drawings which form a part of this original disclosure.

DETAILED DESCRIPTION OF EMBODIMENTS

First Embodiment

Figure 1:
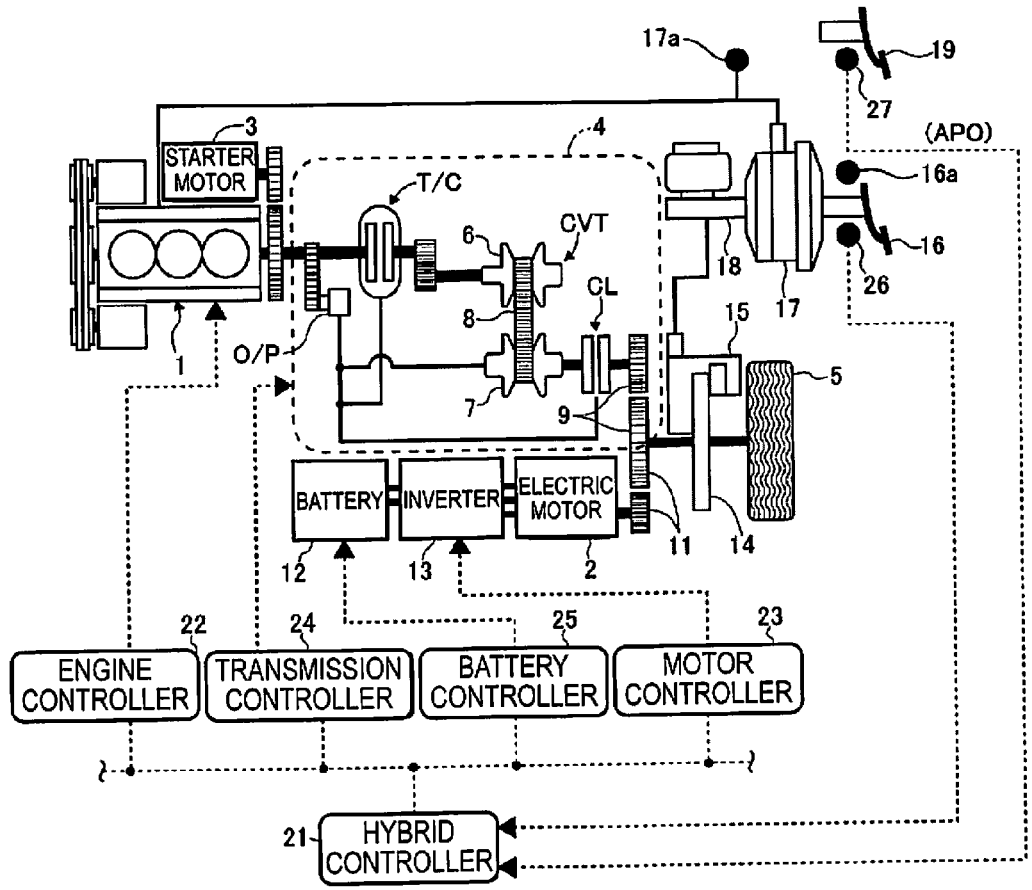
FIG. 1 is a schematic system diagram showing a driving system and an overall control system of a hybrid vehicle with a mode switching control device representing a first embodiment of the present invention.

FIG. 1 is a schematic system diagram showing a driving system and an overall control system of a hybrid vehicle with a control device according to a first embodiment. The hybrid vehicle in FIG. 1 has an engine 1 and an electric motor 2 mounted thereon as drive sources, and the engine 1 is started by a starter motor 3. The engine 1 is drivingly coupled to a drive wheel 5 by a V-belt-type continuously variable transmission 4 so as to be capable of being decoupled as appropriate. An overview of the V-belt-type continuously variable transmission 4 will now be given below.

The V-belt-type continuously variable transmission 4 is a continuously variable transmission mechanism CVT comprising a primary pulley 6, a secondary pulley 7, and a V-belt 8 extended between the pulleys 6, 7. The primary pulley 6 is coupled to a crank shaft of the engine 1 via a torque converter T/C having a lock-up clutch. The secondary pulley 7 is coupled to the drive wheel 5 via a clutch CL and a final gear set 9 in the sequence mentioned. Thus, in a state in which the clutch CL is engaged, power from the engine 1 is inputted through the torque converter T/C into the primary pulley 6, reaches the drive wheel 5 through the V-belt 8, the secondary pulley 7, the clutch CL, and the final gear set 9, and contributes towards traveling of the hybrid vehicle.

During the transmitting of engine power, reducing the pulley V-groove width of the primary pulley 6 and increasing the pulley V-groove width of the secondary pulley 7 results in an increase in the arc diameter by which the V-belt 8 is wound around the primary pulley 6 and a reduction in the arc diameter by which the V-belt 8 is wound around the secondary pulley 7, making it possible for the V-belt-type continuously variable transmission 4 to upshift to a high-side pulley ratio (high-side gear speed ratio). When the upshift to a high-side gear speed ratio is performed to the limit, the gear speed ratio is set to a maximum gear speed ratio.

Conversely, increasing the pulley V-groove width of the primary pulley 6 and reducing the pulley V-groove width of the secondary pulley 7 results in a reduction in the arc diameter by which the V-belt 8 is wound around the primary pulley 6 and an increase in the arc diameter by which the V-belt 8 is wound around the secondary pulley 7, making it possible for the V-belt-type continuously variable transmission 4 to downshift to a low-side pulley ratio (low-side gear speed ratio). When the downshift to a low-side gear speed ratio is performed to the limit, the gear speed ratio is set to a minimum gear speed ratio.

The continuously variable transmission 4 has an input rotation sensor 6a for detecting the rotation speed of the primary pulley 6 and an output rotation sensor 7a for detecting the rotation speed of the secondary pulley 7. The actual gear speed ratio is calculated on the basis of the rotation speeds detected by the rotation sensors, and the pulleys are hydraulically or otherwise controlled so that the actual gear speed ratio reaches a target gear speed ratio.

The electric motor 2 is permanently coupled to the drive wheel 5 via a final gear set 11, and the electric motor 2 is driven via an inverter 13 by power from a battery 12.

The inverter 13 converts DC power from the battery 12 to AC power and supplies the AC power to the electric motor 2, and increases and decreases the power supplied to the electric motor 2 to control the driving force and the rotation direction of the electric motor 2.

In addition to the motor driving described above, the electric motor 2 also functions as a generator, and is also utilized for regenerative braking described further below. During regenerative braking, the inverter 13 applies a power generation load corresponding to the regenerative braking force on the electric motor 2, whereby the electric motor 2 is made to function as a power generator and the power generated by the electric motor 2 is stored in the battery 12.

In the hybrid vehicle according to the first embodiment, when the electric motor 2 is driven in a state in which the clutch CL is released and the engine 1 is stopped, only the power from the electric motor 2 passes through the final gear set 11 and reaches the drive wheel 5, and [the vehicle] travels in electric travel mode (EV mode) in which only the electric motor 2 is used for travel. Keeping the clutch CL released during this period prevents the engine 1, which is in a stopped state, from being dragged, and suppressing wasteful power consumption during EV travel.

When the engine 1 is started using the starter motor 3 and the clutch CL is engaged in the above EV travel state, power from the engine 1 sequentially passes through the torque converter T/C, the primary pulley 6, the V-belt 8, the secondary pulley 7, the clutch CL, and the final gear set 9 and reaches the drive wheel 5, and the hybrid vehicle travels in hybrid travel mode (HEV mode) in which the engine 1 and the electric motor 2 are used for travel.

Bringing the hybrid vehicle to a stop from the above travel state or keeping the vehicle in the stopped state is achieved by clamping, using a caliper 15, a brake disc 14 which rotates with the drive wheel 5, and braking the brake disc 14. The caliper 15 is connected to a master cylinder 18 for outputting a brake liquid pressure corresponding to the brake-pedal-depressing force through a negative pressure-type brake booster 17 (corresponding to a boosting means) in response to the depression force acting on a brake pedal 16 depressed by the driver. The caliper 15 uses the brake liquid pressure to cause the caliper 15 to operate and brake the brake disc 14. The negative pressure-type brake booster 17 uses the engine 1 intake negative pressure to assist the brake-pedal-depressing force applied by the driver, and can sufficiently perform the boosting function if the negative pressure detected by a negative pressure sensor 17a is equal to or greater than a predetermined value. In both the EV mode and the HEV mode, the drive wheel 5 of the hybrid vehicle is driven by a torque corresponding to a driving force command produced by the driver depressing an acceleration pedal 19, and the hybrid vehicle is caused to travel by a driving force corresponding to that requested by the driver.

A hybrid controller 21 selects the travel mode of the hybrid vehicle, controls the output of the engine 1, controls the rotation direction and the output of the electric motor 2, controls the shift of the continuously variable transmission 4, controls the engaging/releasing of the clutch CL, and controls the charging/discharging of the battery 12. The hybrid controller 21 controls the above elements through a corresponding engine controller 22, motor controller 23, transmission controller 24, and battery controller 25.

Accordingly, a signal from a brake switch 26, which is a normally open switch that switches from OFF to ON during braking when the brake pedal 16 is depressed, a signal from a stroke sensor 16a for detecting the stroke amount for the brake pedal 16, and a signal from an accelerator position sensor 27 for detecting the accelerator pedal depression amount (accelerator position) APO, are inputted into the hybrid controller 21. The hybrid controller 21 also exchanges internal information with the engine controller 22, the motor controller 23, the transmission controller 24, and the battery controller 25.

The engine controller 22 controls the output of the engine 1 in response to a command from the hybrid controller 21. The motor controller 23 controls the rotation direction and the output of the electric motor 2 through the inverter 13 in response to a command from the hybrid controller 21. The transmission controller 24 controls the engaging/releasing of the clutch CL and the shift of the continuously variable transmission 4 (V-belt-type continuously variable transmission mechanism CVT) using oil from an engine-driven oil pump O/P in response to a command from the hybrid controller 21. The battery controller 25 controls the charging/discharging of the battery 12 in response to a command from the hybrid controller 21.

In FIG. 1, a dedicated clutch CL is provided to the continuously variable transmission 4 in order to decouplably couple the V-belt-type continuously variable transmission mechanism CVT (secondary pulley 7) and the drive wheel 5.

Figures 2A, 2B:
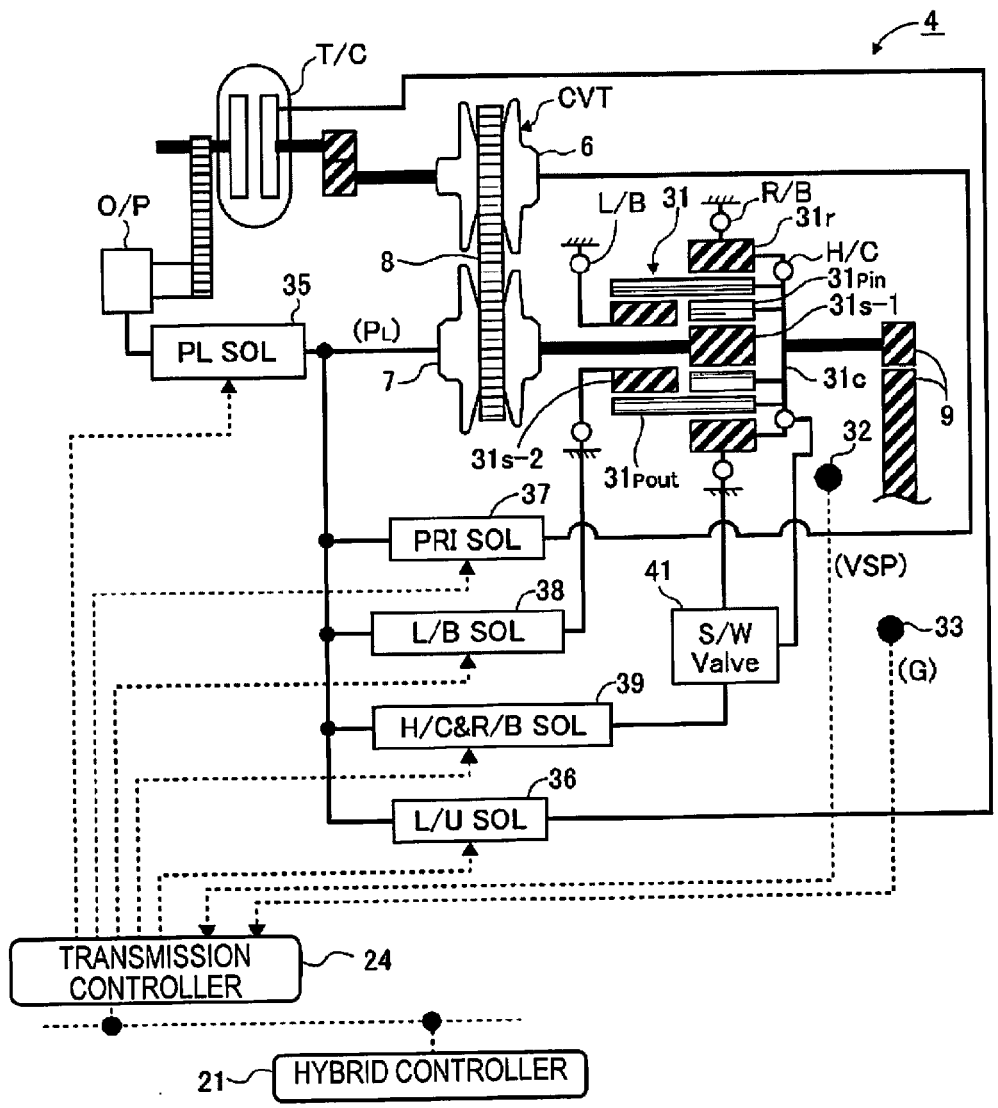
FIG. 2A is a schematic system diagram showing a driving system and an overall control system of another type of hybrid vehicle to which the regenerative braking control device of the present invention can be applied
FIG. 2B is a logic diagram showing the manner in which transmission friction elements in an auxiliary transmission provided in a V-belt type continuously variable transmission in a driving system of the hybrid vehicle of FIG. 2A are engaged.

However, if the continuously variable transmission 4 is internally provided with an auxiliary transmission 31 between the V-belt-type continuously variable transmission mechanism CVT (secondary pulley 7) and the drive wheel 5 as shown as an example in FIG. 2(a), a friction element (e.g., a clutch or a brake) governing the shifting of the auxiliary transmission 31 may be utilized so as to decouplably couple the V-belt-type continuously variable transmission mechanism CVT (secondary pulley 7) and the drive wheel 5 to each other. Such a feature is beneficial in terms of cost as there is no need to further provide a dedicated clutch for decouplably coupling the V-belt-type continuously variable transmission mechanism CVT (secondary pulley 7) and the drive wheel 5 with each other.

The auxiliary transmission 31 in FIG. 2A comprises a Ravigneaux planetary gear set comprising composite sun gears $31s$-1, $31s$-2, an inner pinion 31pin, an outer pinion 31pout, a ring gear $31r$, and a carrier $31c$ for rotatably supporting the pinions 31pin, 31pout.

From among the composite sun gears $31s$-1, $31s$-2, the sun gear $31s$-1 is coupled to the secondary pulley 7 so as to operate as an input rotation member, and the sun gear $31s2$ is disposed coaxially, albeit capable of freely rotating, with respect to the secondary pulley 7.

The inner pinion 31pin is engaged with the sun gear $31s$-1, and each of the inner pinion 31pin and the sun gear $31s2$ is engaged with the outer pinion 31pout.

The outer pinion 31pout is engaged with the inner periphery of the ring gear $31r$, and the carrier $31c$ is coupled to the final gear set 9 so as to operate as an output rotation member.

The carrier $31c$ and the ring gear $31r$ can be coupled as appropriate by a high clutch H/C, the ring gear $31r$ can be fixed as appropriate by a reverse brake RIB, and the sun gear $31s2$ can be fixed as appropriate by a low brake L/B.

The auxiliary transmission 31 is such that engaging the high clutch H/C, the reverse brake RIB, and the low brake L/B, which are transmission friction elements, in the combinations indicated by circles in FIG. 2B and releasing the remaining elements as indicated by crosses in FIG. 2B makes it possible to select the shift stage from a forward first speed, a forward second speed, and reverse. When the high clutch H/C, the reverse brake R/B, and the low brake L/B are all released, the auxiliary transmission 31 is in a neutral state in which power transmission does not take place. From this state, if the low brake L/B is engaged, the auxiliary transmission 31 is placed in a state in which the first forward speed is selected (speed reduction state); if the high clutch H/C is engaged, the auxiliary transmission 31 is placed in a state in which the second forward speed is selected (directly connected state); and if the reverse brake R/B is engaged, the auxiliary transmission 31 is placed in a state in which reverse gear is selected (reverse state).

The continuously variable transmission 4 in FIG. 2A is such that releasing all of the transmission friction elements H/C, R/B, and L/B and putting the auxiliary transmission 31 in a neutral state make it possible to decouple the V-belt-type continuously variable transmission mechanism CVT (secondary pulley 7) and the drive wheel 5 from each other. Accordingly, in the continuously variable transmission 4 in FIG. 2A, the transmission friction elements H/C, R/B, and LB of the auxiliary transmission 31 fulfill the function of the clutch CL in FIG. 1, and the V-belt-type continuously variable transmission mechanism CVT (secondary pulley 7) and the drive wheel 5 can be decouplably coupled to each other without further providing a clutch CL as shown in FIG. 1.

The continuously variable transmission 4 shown in FIG. 2A is controlled through a working medium of oil from the engine-driven oil pump O/P. The above control of the continuously variable transmission 4 is performed as follows by the transmission controller 24 through a line pressure solenoid 35, a lock-up solenoid 36, a primary pulley pressure solenoid 37, a low brake pressure solenoid 38, a high clutch pressure and reverse brake pressure solenoid 39, and a switch valve 41. In addition to the signal described above with reference to FIG. 1, a signal from a vehicle speed sensor 32 for detecting the vehicle speed VSP and a signal from an acceleration sensor 33 for detecting the vehicle acceleration/deceleration degree G are inputted into the transmission controller 24.

The line pressure solenoid 35 adjusts, in response to a command from the transmission controller 24, the pressure of the oil from the oil pump O/P to a line pressure PL corresponding to the driving force required for the vehicle and supplies the line pressure PL as a secondary pulley pressure to the secondary pulley 7 at all times, whereby the secondary pulley 7 clamps the V-belt 8 at a thrust corresponding to the line pressure PL so that no slippage takes place.

The lock-up solenoid 36 directs the line pressure PL towards the torque converter T/C as appropriate in response to a lock-up signal from the transmission controller 24, and thereby puts the torque converter T/C in a lock-up state in which the input and output elements are directly connected as required.

The primary pulley pressure solenoid 37 adjusts the line pressure PL to a primary pulley pressure in response to a CVT gear speed ratio command from the transmission controller 24 and supplies the primary pulley pressure to the primary pulley 6, whereby the V-groove width of the primary pulley 6 and the V-groove width of the secondary pulley 7 supplied with the line pressure PL are controlled so that the CVT gear speed ratio matches the command from the transmission controller 24, and the CVT gear speed ratio command from the transmission controller 24 is realized.

When the transmission controller 24 issues a first speed selection command for the auxiliary transmission 31, the low brake pressure solenoid 38 feeds the line pressure PL as a low brake pressure to the low brake L/B and thereby causes the low brake L/B to engage, and the first speed selection command is realized.

When the transmission controller 24 issues a second speed selection command or a reverse selection command for the auxiliary transmission 31, the high clutch pressure and reverse brake pressure solenoid 39 supplies the line pressure PL to the switch valve 41 as a high clutch pressure and a reverse brake pressure.

When the second speed selection command is issued, the switch valve 41 directs the line pressure PL from the solenoid 39 to the high clutch H/C as a high clutch pressure, and causes the high clutch H/C to engage, whereby the second speed selection command for the auxiliary transmission 31 is realized.

When the reverse selection command is issued, the switch valve 41 directs the line pressure PL from the solenoid 39 towards the reverse brake R/B as a reverse brake pressure, and causes the reverse brake R/B to engage, whereby the reverse selection command for the auxiliary transmission 31 is realized.

EV Deceleration Regeneration Mode

The EV deceleration regeneration mode of the hybrid vehicle according to the first embodiment will now be described with reference to the vehicle driving system in FIG. 1. In a case in which the acceleration pedal 19 is released during HEV travel so as to make a shift to coasting (inertial travel), or in a case in which the brake pedal 16 is subsequently depressed and the vehicle is braked, regenerative deceleration control in which the electric motor 2 performs regenerative braking is performed. The kinetic energy of the vehicle is thereby converted into electrical power, and the electrical power is stored in the battery 12, whereby energy efficiency is improved.

When regenerative braking is performed during HEV travel (i.e., during HEV regeneration), since the clutch CL is in an engaged state, the regenerative braking energy decreases by an amount corresponding to the reverse driving force of the engine (engine braking) and the friction in the continuously variable transmission 4, resulting in poor engine regeneration efficiency.

Therefore, when the vehicle speed falls below a predetermined vehicle speed, there is selected an EV deceleration regeneration mode, in which the clutch CL is put in a released state, the engine 1 and the continuously variable transmission 4 are decoupled from the drive wheel 5 and a shift is made to EV travel to produce an EV regeneration state, the drag in the engine 1 and the continuously variable transmission 4 is thereby removed, and the corresponding energy regeneration amount is thereby saved.

While the clutch CL is released as described above, the engine 1 is stopped so that an unnecessary operation does not take place from the viewpoint of fuel economy. Therefore, injection of fuel into the engine 1 is prohibited from restarting (i.e., fuel-cut recovery is prevented) so that the discontinuation of fuel injection into the engine 1 (i.e., fuel cut), which was in place during the above coasting, is maintained when the clutch CL is released. As a result, the engine 1 is stopped when the clutch CL is released. Fuel-cut recovery refers to a control in which fuel injection is restarted when, in a state in which fuel injection is discontinued, the engine rotation speed falls below the minimum rotation speed at which the engine 1 is capable of self-rotating (e.g., the idling rotation speed), whereby an engine operation state is obtained without starting the engine using the starter motor 3. Note that in order to stop the operation of the engine 1 in EV mode, the fuel-cut recovery control is prohibited from operating, whereby the engine 1 is stopped.

However, a problem was presented that when the engine 1 is stopped as described above, it is not possible to obtain a negative pressure in the engine 1, preventing the assist function from the negative pressure-type brake booster 17 from being obtained.

For example, in a configuration in which the travel mode is switched so as to shift to EV travel when the vehicle speed falls below a predetermined vehicle speed during coasting while HEV travel is being performed, setting the predetermined vehicle speed at a higher vehicle speed makes it possible to obtain a higher regenerative energy and can therefore be said to be preferable. However, assuming that the deceleration degree is uniform, setting a higher vehicle speed [as the predetermined speed] increases the length until the vehicle comes to a stop and therefore gives the driver more opportunities to repeat the operations of depressing and easing the brake pedal 16.

In the negative pressure-type brake booster 17, if the brake pedal 16 is repeatedly operated with the engine 1 in a stopped state of operation, there is a risk of the consumption of negative pressure preventing a sufficient assist force from being obtained, resulting in a risk of producing a state in which the brake pedal 16 cannot be significantly depressed and of imparting the driver with a sense of unease. This is because the negative pressure-type brake booster 17 has a structure in which, when the piston position in the master cylinder is returned after the brake pedal 16 is depressed, negative pressure is lost.

Accordingly, in the first embodiment, when the clutch CL is put in a released state and regenerative braking is performed using the electric motor 2, the engine rotation speed is kept to a predetermined rotation speed or above in order to ensure negative pressure is produced.

Figure 3:
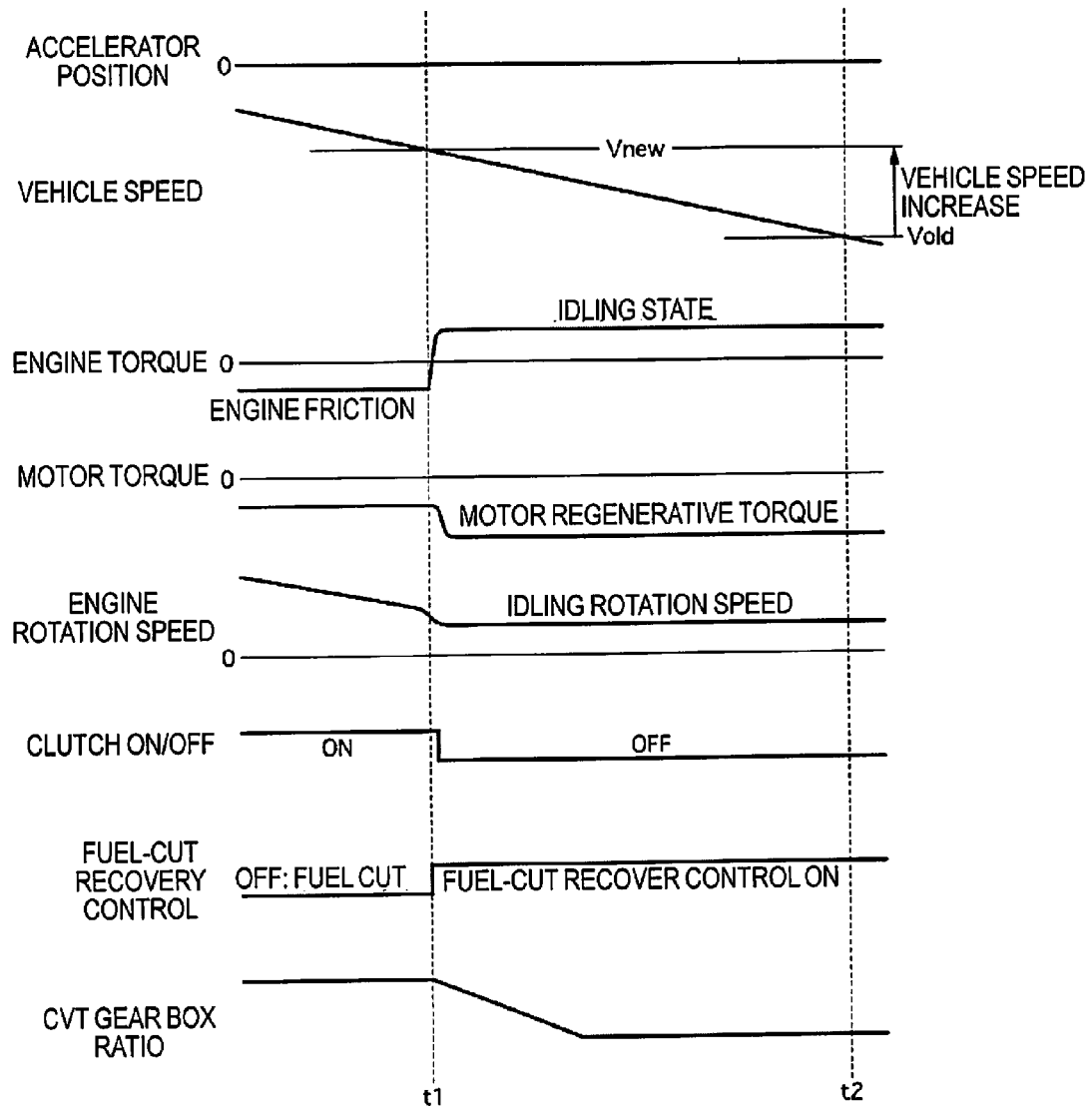
FIG. 3 is a time chart showing a control process in the EV deceleration mode according to the first embodiment.

FIG. 3 is a time chart showing the control process in the EV deceleration regeneration mode of the first embodiment. The initial state is one in which at [a speed] equal to or higher than the predetermined vehicle speed Vnew at which the lock-up clutch is engaged, the acceleration pedal 19 is released and [the vehicle is] coasting in HEV travel mode. The description will be given together with a comparative example in which the predetermined speed is set to Vold which is lower than Vnew and the engine 1 is not operated when the clutch CL is released.

When, at time t1, the vehicle speed falls below the predetermined vehicle speed Vnew, the fuel-cut recovery control is started. Then, both the clutch CL and the lock-up clutch are released. Accordingly, even when the engine rotation speed rapidly falls to the vicinity of the idling rotation speed due to the clutch CL and the lock-up clutch being released, the fuel-cut recovery control causes the fuel injection to restart, and the engine is put in an idling state at which the idling rotation speed is maintained and a predetermined torque is outputted. It is thereby possible to ensure that negative pressure is produced, making it possible to ensure that the negative pressure-type brake booster 17 delivers the assist function. In addition, it is possible to ensure operation of the oil pump O/P for supplying hydraulic pressure to the continuously variable transmission 4, making it possible to continuously maintain the gear speed ratio control of the continuously variable transmission 4, and produce the desired gear speed ratio.

Releasing the clutch CL results in a deficit amounting to the engine friction torque. Therefore, the regenerative torque from the electric motor 2 is increased to ensure the control torque is obtained.

In contrast, in the comparative example, the engine 1 is not operated when the clutch is released, preventing the negative pressure from being obtained. Therefore, it is necessary to set the predetermined vehicle speed to a lower vehicle speed so as to shorten the state in which the clutch CL is released. Accordingly, the predetermined vehicle speed is set to Vold which is lower than Vnew, and the clutch CL is not released until [the vehicle speed] has fallen to Vold at time t2. Accordingly, in the comparative example, while the vehicle speed falls from Vnew to Vold, the clutch CL cannot be released and no regenerative energy can be obtained, but in the first embodiment, it is possible to obtain sufficient regeneration energy during this period.

As described above, in the first embodiment, the following effects are obtained.

(1) The hybrid vehicle control device according to the first embodiment is provided with:

a continuously variable transmission 4 (transmission) coupled to an output shaft of an engine 1;

a clutch CL interposed between the continuously variable transmission 4 and a drive wheel;

an electric motor (motor) 2 coupled to the drive wheel;

a negative pressure-type brake booster 17 (boosting means or device) for using a negative pressure of the engine 1 to assist the brake-pedal-16-depressing force applied by a driver; and a hybrid controller 21 (control means or controller) for controlling the output state of the engine 1 and the electric motor 2, the gear speed ratio of the continuously variable transmission 4, and engaging/releasing of the clutch CL according to the operation state, the hybrid controller 21 being capable of switching, between an operating state and a non-operating state, a fuel-cut recovery control in which the engine rotation speed is kept at or above an idling rotation speed by starting supply of fuel upon engine rotation speed falling to the idling rotation speed from a state in which the engine rotation speed is higher than the idling rotation speed (predetermined rotation speed) and the supply of fuel is stopped;

an EV deceleration regeneration mode being a mode in which when the vehicle decelerates from a high-vehicle-speed state higher than a predetermined vehicle speed to a vehicle speed equal to or lower than the predetermined vehicle speed with the clutch in an engaged state, the clutch CL is switched from an engaged state to a released state and a regenerative torque is imparted by the electric motor 2 to the drive wheel; and when the EV deceleration regeneration mode is set, the fuel-cut recovery control being switched to the operating state prior to the clutch CL being switched from an engaged state to a released state, and the engine rotation speed being kept at or above an idling rotation speed (predetermined rotation speed).

In other words, keeping the engine rotation speed at or above the idling rotation speed makes it possible to ensure that a negative pressure is produced, and even if the driver repeats the brake pedal operation prior to the vehicle coming to a stop, the negative pressure-type brake booster 17 is able to deliver an assist function, making it possible for the brake pedal 16 to be depressed. Accordingly, braking can be performed without imparting the driver with a sense of unease.

In addition, operating the fuel-cut recovery control prior to releasing the clutch CL makes it possible to produce a state in which the engine 1 is self-rotating without the engine rotation speed decreasing when the clutch CL is released. If the fuel-cut recovery control was already functioning prior to the vehicle speed reaching the predetermined vehicle speed, the fuel-cut recovery control is simply continued.

In addition, since negative pressure can be obtained, the predetermined vehicle speed Vnew can be set so as to be relatively high, making it possible to recover regenerative energy in a more efficient manner. Furthermore, since it is possible to maintain the rotating state of the continuously variable transmission 4 and to obtain a supply of hydraulic pressure due to operation of the oil pump O/P, the continuously variable transmission 4 can be shifted to a desired gear speed ratio, and an appropriate gear speed ratio can be obtained, e.g., during a restart or when there is a request for a reacceleration.

Second Embodiment

A second embodiment will now be described. The basic configuration is the same as that of the first embodiment; therefore, a description will be given with regards to the differences. In the first embodiment, when the EV deceleration regeneration mode is selected, the engine 1 is put in an idling state. In contrast, in the second embodiment, as a brake request made by the driver, the negative pressure of the negative pressure-type brake booster 17 is detected by the negative pressure sensor 17*a*, and the presence of a predetermined value (negative pressure necessary for braking) is determined. If the predetermined value is not available, a negative pressure request is outputted, and the operation state of the engine 1 is maintained. If the negative pressure is available, the negative pressure request is stopped, i.e., the fuel-cut recovery control is prohibited from taking place. The negative pressure necessary for braking refers to, e.g., a value at which a rapid deceleration to a state in which the vehicle has come to a stop is possible.

Figure 4:
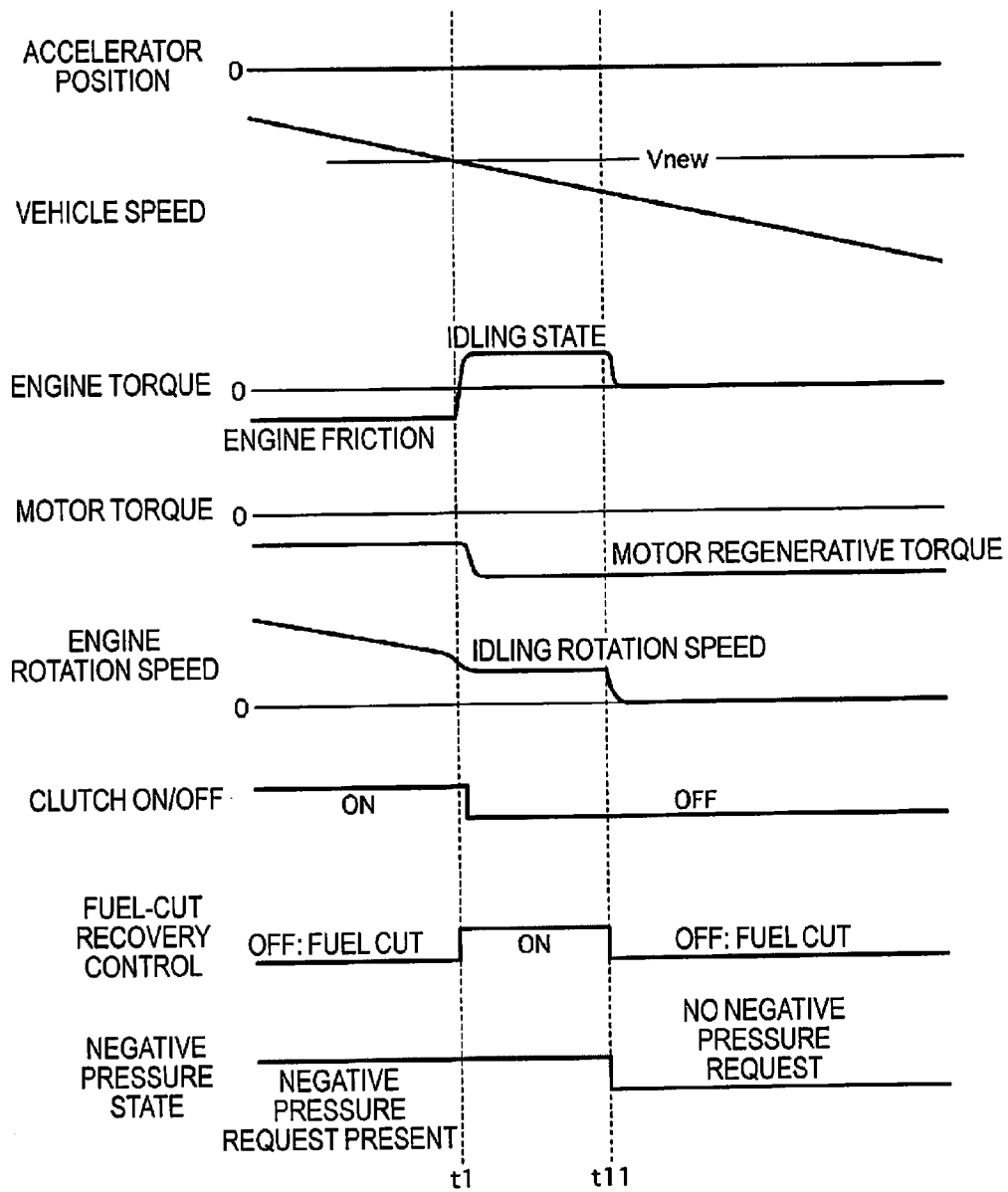
FIG. 4 is a time chart showing a control process in the EV deceleration mode according to a second embodiment.

FIG. 4 is a time chart showing the control process in the EV deceleration regeneration mode of the second embodiment. The initial state is one in which at a speed equal to or higher than the predetermined vehicle speed Vnew at which the lock-up clutch is engaged, the acceleration pedal 19 is released, the brake pedal 16 is depressed, a brake request is outputted, and the vehicle is decelerating in HEV travel mode.

When, at time t1, the vehicle speed falls below the predetermined vehicle speed Vnew, the fuel-cut recovery control is started. Then, both the clutch CL and the lock-up clutch are released. Accordingly, even when the engine rotation speed rapidly falls to the vicinity of the idling rotation speed due to the clutch CL and the lock-up clutch being released, the fuel-cut recovery control causes the fuel injection to restart, and the engine is put in an idling state at which the idling rotation speed is maintained and a predetermined torque is outputted. Negative pressure is thereby obtained, making it possible to ensure that the negative pressure-type brake booster 17 delivers the assist function.

When, at time t11, a negative pressure necessary for braking is obtained, there is no longer a need to produce a negative pressure; therefore, the fuel-cut recovery control is prohibited, and the operation of the engine 1 is thereby stopped. It is thereby possible to suppress wasteful fuel consumption.

As described above, in the second embodiment, the following effects are obtained.

(2) The hybrid vehicle control device according to the second embodiment has a negative pressure sensor 17*a* (brake request detection means or device) for detecting a negative pressure (whether or not a brake request made by the driver is satisfied);

the hybrid controller 21, upon it being detected that the brake request is satisfied while the engine rotation speed is kept at or above the idling rotation speed, reduces the engine rotation speed to below the idling rotation speed.

It is thereby possible to suppress wasteful fuel consumption and improve fuel economy.

Third Embodiment

A third embodiment will now be described. The basic configuration is the same as that of the second embodiment; therefore, a description will be given with regards to the differences. In the third embodiment, when the operation of the engine 1 is stopped as with the second embodiment and the braking force requested by the driver subsequently becomes equal to or greater than a predetermined value, the clutch CL is engaged to ensure negative pressure is obtained. In the third embodiment, with regards to the required braking force value, a determination is made on the basis of whether or not the stroke amount detected by the stroke sensor 16*a* is equal to or greater than a predetermined value. However, the above is not provided by way of limitation; any configuration capable of detecting the brake request made by the driver, such as one for detecting, e.g., the master cylinder pressure or the depression force, is also possible.

Figure 5:
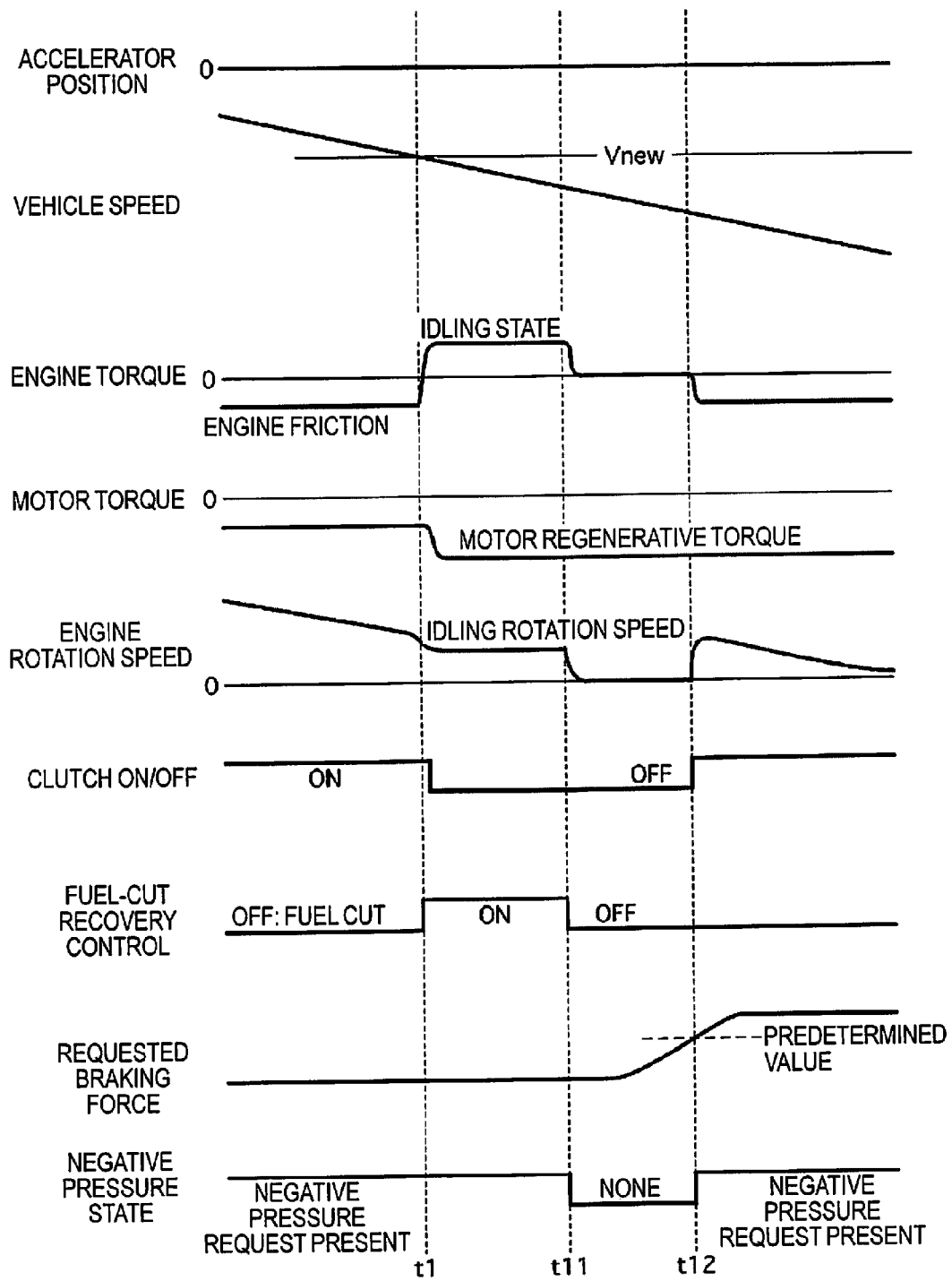
FIG. 5 is a time chart showing a control process in the EV deceleration mode according to a third embodiment.

FIG. 5 is a time chart showing the control process in the EV deceleration regeneration mode of the third embodiment. The initial state is one in which at a speed equal to or higher than the predetermined vehicle speed Vnew at which the lock-up clutch is engaged, the acceleration pedal 19 is released, the brake pedal 16 is depressed, a brake request is outputted, and the vehicle is decelerating in HEV travel mode. The control process is identical to that in the second embodiment until time t11; therefore, a description will be given with regards to the period after time t11.

When, at time t12, the driver depresses the brake pedal 16, and a requested braking force equal to or greater than a predetermined value is detected, the clutch CL switches from a released state to an engaged state. Then, the engine rotation speed increases to that determined according to the vehicle speed and the gear speed ratio, and it becomes possible to generate a negative pressure. At this time, the torque increases by an amount corresponding to the engine friction, and the regenerative torque of the electric motor 2 is reduced by a corresponding amount. The fuel-cut recovery control remains OFF at this time, making it possible to ensure a negative pressure is obtained while preventing the fuel economy from worsening due to injection of fuel.

As described above, in the third embodiment, the following effects are obtained.

(3) The hybrid controller 21 switches the clutch CL from a released state to an engaged state when the braking force required by the driver is equal to or greater than a predetermined value while the engine is stopped (while the engine rotation speed is reduced to below the idling rotation speed). Accordingly, it is possible to increase the engine rotation speed without using the starter motor 3 or another element, and to ensure a negative pressure is obtained while improving the durability of the starter motor 3. In addition, there is no need to perform injection of fuel, and the fuel economy can be improved.

In the third embodiment, the negative pressure of the engine 1 is used. However, a configuration in which the continuously variable transmission 4 is provided with a pump or a similar element capable of generating a negative pressure, and the negative pressure is produced using the pump or a similar element, is also possible. In such a case, the negative pressure can be efficiently obtained by engaging the clutch CL, even if the lock-up clutch is kept released.

Fourth Embodiment

A fourth embodiment will now be described. The basic configuration is the same as that of the second embodiment; therefore, a description will be given with regards to the differences. In the fourth embodiment, when the operation of the engine 1 is stopped as with the second embodiment and the braking force requested by the driver subsequently becomes equal to or greater than a predetermined value, the fuel-cut recovery control is switched to an operating state, the engine 1 is cranked using the starter motor 3, and the engine is started, whereby a negative pressure is obtained.

Figure 6:
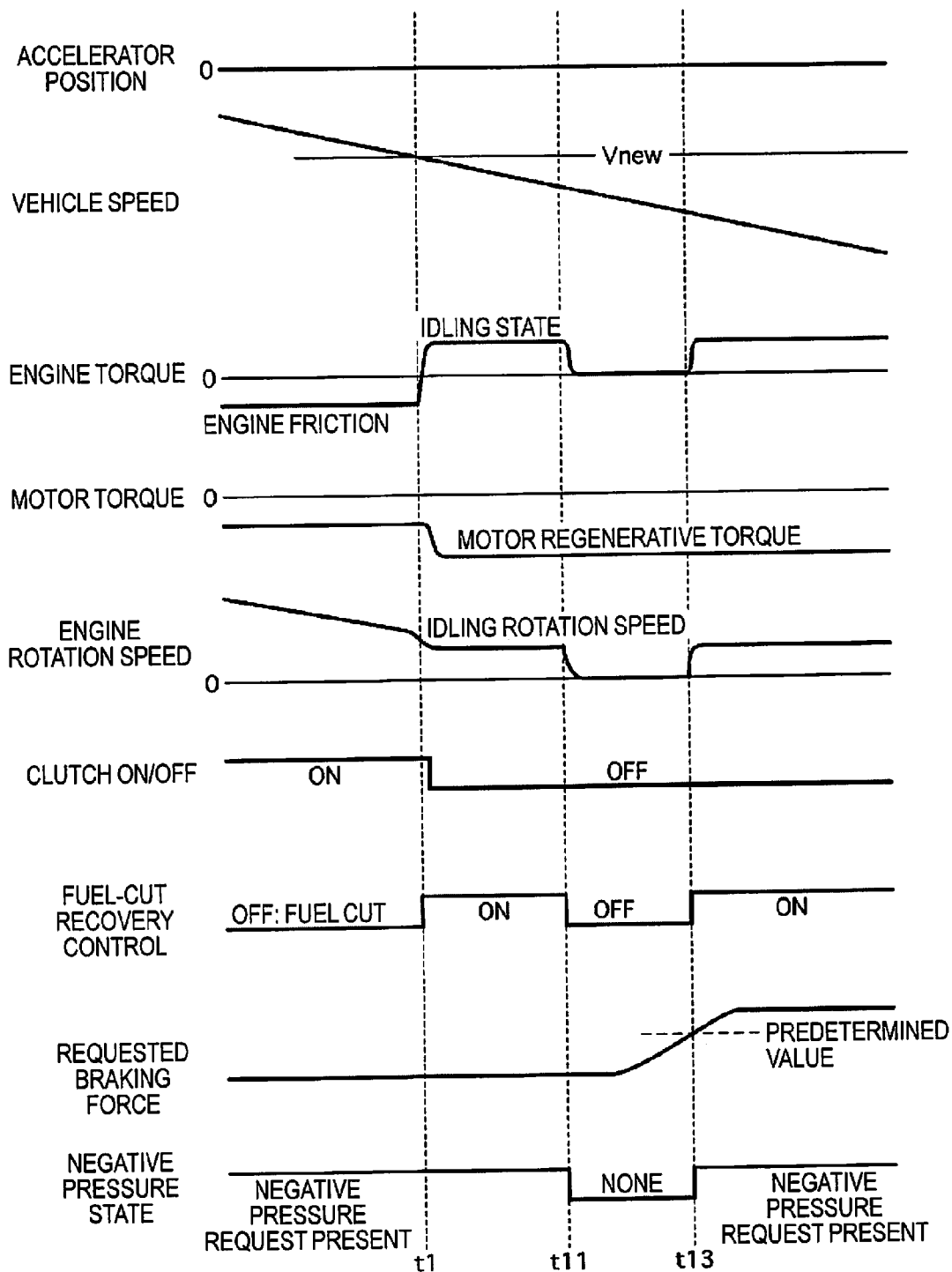
FIG. 6 is a time chart showing a control process in the EV deceleration mode according to a fourth embodiment.

FIG. 6 is a time chart showing the control process for the EV deceleration regeneration mode of the fourth embodiment. The initial state is one in which at a speed equal to or higher than the predetermined vehicle speed Vnew at which the lock-up clutch is engaged, the acceleration pedal 19 is released, the brake pedal 16 is depressed, a brake request is outputted, and the vehicle is decelerating in HEV travel mode. The control process is identical to that in the second embodiment until time t11; therefore, a description will be given with regards to the period after time t11.

When, at time t13, the driver depresses the brake pedal 16, and a required braking force equal to or greater than a predetermined value is detected, the fuel-cut recovery control is switched from a prohibited state to a permitted state, and the engine 1 is cranked and started using the starter motor 3. It is thereby possible for the engine 1 to maintain the idling rotation speed, and for a negative pressure to be obtained. The clutch CL remains released, and the regenerative torque of the electric motor 2, etc., remains unaffected, making it possible to prevent phenomena such as a variation in the braking torque during braking.

In addition, since the engine 1 is operating, even if the driver depresses the acceleration pedal 19 and issues a reacceleration request or a restart request at this time, a sufficient torque can be swiftly obtained, making it possible to improve the response to the reacceleration request or the restart request.

As described above, in the fourth embodiment, the following effects are obtained.

(4) The hybrid controller 21 increases the engine rotation speed to or above the idling rotation speed when the braking requested by the driver is equal to or greater than a predetermined braking force while the engine 1 is stopped (while the engine rotation speed is reduced to below the idling rotation speed). It is thereby possible for the engine 1 to maintain the idling rotation speed, and for a negative pressure to be obtained. In addition, since the engine 1 is operating, even if the driver issues a reacceleration request or a restart request, a sufficient torque can be swiftly obtained, making it possible to improve the response to the reacceleration request or the restart request.

The present invention was described above with reference to embodiments. However, the present invention is not limited to the configurations described above; other configurations may also be included in the present invention.

The first embodiment indicated an example in which the engine rotation speed is kept at or above the predetermined rotation speed by performing fuel-cut recovery on the engine 1. However, from the viewpoint of simply securing a sufficient engine rotation speed, a sufficient engine rotation speed may be secured using the starter motor 3 or a similar element without injecting fuel.

In addition, in the embodiments, a sufficient engine rotation speed is secured on the basis of a negative pressure requirement or a braking force request. However, a configuration is also possible in which a sufficient engine rotation speed is secured on the basis of, e.g., an alternator power generation requirement.

Furthermore, the embodiments indicated configurations in which the engine is restarted by engaging the clutch CL or using the starter motor 3; however, other configurations are possible. Specifically, a technical feature being put in practical use in recent years is a vehicle with an idling-stop function wherein the alternator is replaced with a motor generator, an alternator function is added to the motor generator to impart the motor generator with an engine-starting function, and the engine is thereby restarted from an idling-stopped state using the motor generator instead of a starter motor. The present invention may be configured so that the engine is restarted using a motor generator as described above.

In addition, in the present embodiment, whether or not the vehicle is in a braking state is determined on the basis of whether the brake switch is ON or OFF. However, this is not provided by way of limitation; the determination can be made on the basis of an output value from the stroke sensor of the brake pedal or on the basis of an output value from a brake liquid pressure sensor for detecting the master cylinder pressure or another parameter.

The invention claimed is:

1. A control device for a hybrid vehicle, comprising:
a continuously variable transmission coupled to an output shaft of an engine;
a clutch interposed between the transmission and a drive wheel;
a motor coupled to the drive wheel;
a boosting configured to use a negative pressure of the engine to assist a brake-pedal-depressing force applied by a driver; and
a controller programmed to control an output state of the engine and the motor, a gear speed ratio of the transmission, and engaging and releasing of the clutch according to an operation state,
the controller programmed to switch, between an operating state and a non-operating state, a fuel-cut recovery control in which the engine rotation speed is kept at or above a predetermined rotation speed by starting supply of fuel upon the engine rotation speed falling to the predetermined rotation speed from a state in which the engine rotation speed is higher than the predetermined rotation speed and the supply of fuel is stopped;
a deceleration regeneration mode being a mode in which, when the vehicle decelerates from a high-vehicle-speed state higher than a predetermined vehicle speed to a vehicle speed equal to or lower than the predetermined vehicle speed with the clutch in an engaged state, the clutch is switched from an engaged state to a released state and a regenerative torque is imparted by the motor to the drive wheel; and
when the deceleration regeneration mode is set, the fuel-cut recovery control is switched to the operating state prior to the clutch being switched from an engaged state to a released state, and the engine rotation speed being kept at or above the predetermined rotation speed.

2. The hybrid vehicle control device according to claim 1, further comprising
a brake request detection device configured to detect whether or not a brake request made by the driver is satisfied;
the controller, upon the brake request detection device detecting that the brake request is satisfied when the engine rotation speed is kept at or above the predetermined rotation speed, is programmed to reduce the engine rotation speed to below the predetermined rotation speed.

3. The hybrid vehicle control device according to claim 2, wherein
the controller is programmed to switch the clutch from a released state to an engaged state when the braking force required by the driver is equal to or greater than a predetermined value while the engine rotation speed is reduced to below the predetermined rotation speed.

4. The hybrid vehicle control device according to claim 2, wherein
the controller is programmed to increase the engine rotation speed to or above the predetermined rotation speed when the braking requested by the driver is equal to or greater than a predetermined braking force while the engine rotation speed is reduced to below the predetermined rotation speed.

* * * * *